R. G. EDGERTON.
INTERNAL COMBUSTION ENGINE TESTING DEVICE.
APPLICATION FILED MAY 26, 1916.

1,344,387.

Patented June 22, 1920.

Witnesses

Inventor
R. G. Edgerton,
By Norman J. Whitaker
Attorney

UNITED STATES PATENT OFFICE.

ROY G. EDGERTON, OF SUFFOLK, VIRGINIA.

INTERNAL-COMBUSTION-ENGINE-TESTING DEVICE.

1,344,387.

Specification of Letters Patent. Patented June 22, 1920.

Application filed May 26, 1916. Serial No. 100,105.

*To all whom it may concern:*

Be it known that I, ROY G. EDGERTON, a citizen of the United States, and resident of Suffolk, in the county of Nansemond, State of Virginia, have invented certain new and useful Improvements in Internal-Combustion-Engine-Testing Devices, of which the following is a specification.

My invention relates to improvements in internal combustion engine testing devices.

The primary object of the present invention is to provide a testing device for testing the cylinders of engines of the above mentioned character in such a way as to positively tell which of the cylinders are in perfect working condition.

Another important object of my invention is to provide a testing device which may be used to either test the engine cylinders one at a time or to test a plurality of them at the same time.

A further object of the invention is to provide testing device that may be quickly attached or detached from the ignition means of the cylinders.

Still further object of the invention is to provide a device of the above mentioned character which is comparatively small so that the same may be easily carried about.

An additional object of the invention is to provide a testing device which is simple in construction, consists of few parts, is inexpensive to manufacture, and which may be placed on the market at a comparatively low cost.

The above and other objects of the invention will fully appear when taken in connection with the following specification and accompanying drawings, and be explicitly defined in the appended claims.

The invention consists of the novel combinations and arrangement of parts and manner of operation that will be fully set forth hereinafter and illustrated in the accompanying drawings in which Figure 1 is a top view of an internal combustion engine showing my testing device in position for testing the cylinders of the same.

Like characters of reference indicate like parts in all the views.

Figure 1:
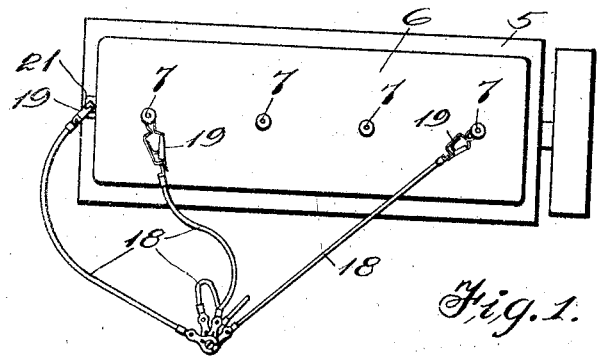
Figure 2:
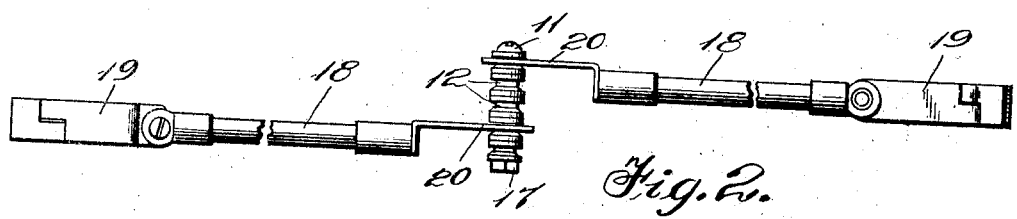
Fig. 2 is a side view of the testing device.
Figure 3:
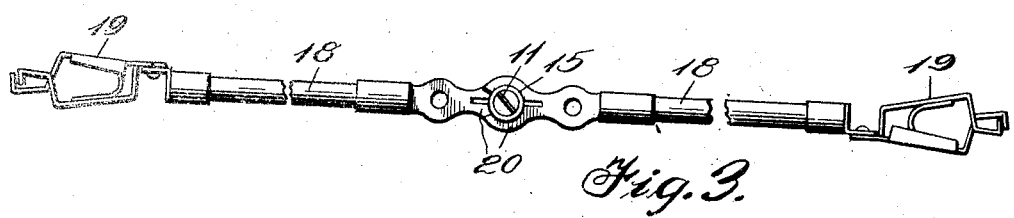
Fig. 3 is a top view of the testing device.
Figures 4, 5:
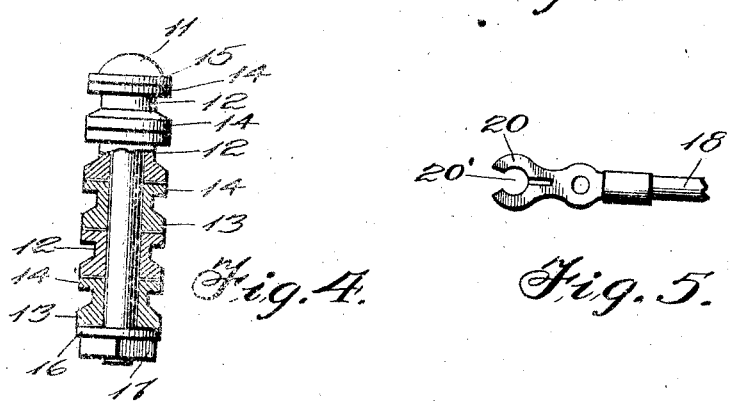
Fig. 4 is a view of the member to which the conductors are connected.
Fig. 5 is a detail view of one end of one of the conductors.

Referring to the drawing, the numeral 5 designates an internal combustion engine which may be of any conventional type. Mounted in the cylinder head 6 of the engine 5 are the usual spark plugs 7 which are in circuit with the usual electrical supply.

The numeral 10 denotes a bolt or pivot member having a head 11 upon one end thereof. Arranged upon the bolt 10 in superposed relation is a plurality of annular members 12 each of which is provided with an opening 13 which accommodates the central member or bolt 10. These members 12 are formed with a collar or flange 14 at their upper end which engages the base 13 of the member 12 next in order and supports the same. Each of the members 12 is beveled toward the outer edge. Arranged upon the bolt 10 between the under face of the head 11 and the upper face of the collar or flange of the topmost member 12 is a washer 15. The lower end of this bolt or central member 10 receives a washer 16 which engages the base 13 of the bottommost member 12. Threaded upon this end of the bolt or central member is a nut 17 which holds the members 12 in contact with each other.

For each of the cylinders 6 is an insulated electricity conductor 18 that have secured to the outer ends thereof spring actuated clamping members 19 which may be quickly attached or detached from the spark plugs.

Mounted upon the opposite end of each of the conductors 18 is a resilient clip 20 having an opening 20' therein that is adapted to receive one of the annular members 20. This form of clip is merely shown for the purpose of illustration, and other forms may be used if it should be so desired. Each of these clips 19 is engaged with one of the annular members 12 and is free to swivel thereon.

The numeral 21 indicates a nut or any other metal part of the engine casing.

The manner of testing internal combustion engine cylinders in accordance with the present invention is as follows:

One of the conductors 18 is engaged with the nut 21 or other metal part of the engine. The other conductors are now detachably engaged with the spark plugs of the cylinders that are to be rendered inoperative which will cause the electric current which flows to the spark plugs to be ground or short circuited to the metal part 21. This will render the cylinders that are in the circuit inoperative.

It is to be noted that in Fig. 1 all the spark plugs are not in circuit with the conductors 18 but it is to be understood that any number of the spark plugs, preferably all but one, may be in circuit with these conductors, thereby showing the exact working condition of the single cylinder left operating.

My testing device may be used for burning carbon from the engine cylinders as well as for testing the cylinders. In using my device for burning carbon from the cylinders of the engine, the conductors are connected up so as to leave one cylinder working and the throttle is wide open. Each of the cylinders are allowed to operate under the above conditions from five to ten minutes or until each has stopped the knocking that will set in soon after the cylinder operating has heated up the carbon in it sufficiently to cause pre-ignition.

Having described the preferred embodiment of my invention I desire it to be understood that the invention is susceptible to various modifications and alterations that may fairly fall within the scope of the appended claims.

What is claimed is:

1. A testing device of the character described including a plurality of electricity conductors detachably connected together and clamping members carried by the outer end of the same.

2. A testing device of the character described including a central member, a plurality of electricity conductors, resilient clips mounted upon the inner ends of the conductors and engaged and loosely connected with the central member and spring actuated clamping members mounted upon the outer ends of the electricity conductors.

ROY G. EDGERTON.